(12) United States Patent
Alexiou et al.

(10) Patent No.: US 10,816,082 B2
(45) Date of Patent: Oct. 27, 2020

(54) VEHICLE DRIVELINE COMPONENT HAVING ROTATABLE LUBRICANT PATHWAY FOR TRANSMITTING LUBRICATING FLUID TO DESIRED LOCATION

(71) Applicant: BorgWarner Inc., Auburn Hills, MI (US)

(72) Inventors: Arie Alexiou, Pontiac, MI (US); Jason P. Eldred, Swartz Creek, MI (US); Ian D. Worcester, Royal Oak, MI (US); Hongtao Wang, Rochester Hills, MI (US); Gurmeet Singh Bedi, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 280 days.

(21) Appl. No.: 16/036,199

(22) Filed: Jul. 16, 2018

(65) Prior Publication Data

US 2020/0018388 A1 Jan. 16, 2020

(51) Int. Cl.
*F16H 57/04* (2010.01)
*B60K 17/28* (2006.01)
*B60K 17/344* (2006.01)

(52) U.S. Cl.
CPC ....... *F16H 57/0424* (2013.01); *F16H 57/045* (2013.01); *F16H 57/0427* (2013.01); *F16H 57/0473* (2013.01); *B60K 17/344* (2013.01)

(58) Field of Classification Search
CPC ............. F16H 57/0424; F16H 57/0427; F16H 57/045; F16H 57/0473; F16D 13/72; F16D 13/73; F16D 25/123; F16D 2069/004; F16D 65/128; F16D 65/853; B60K 17/344; B60K 2306/03
See application file for complete search history.

(56) References Cited

U.S. PATENT DOCUMENTS

| | | | |
|---|---|---|---|
| 3,601,515 A | 8/1971 | Pelizzoni | |
| 4,446,953 A | 5/1984 | Voss et al. | |
| 4,629,050 A | 12/1986 | Valier | |
| 4,841,803 A | 6/1989 | Hamano et al. | |
| 4,914,968 A | 4/1990 | Diermeier et al. | |
| 5,106,351 A * | 4/1992 | Williams | B60K 17/3467 475/250 |
| 5,467,843 A | 11/1995 | Esch et al. | |
| 5,720,372 A | 2/1998 | Shino et al. | |
| 6,189,669 B1 | 2/2001 | Kremer et al. | |
| 6,401,896 B1 | 6/2002 | Schnepf | |
| 6,779,642 B2 | 8/2004 | Arai et al. | |

(Continued)

*Primary Examiner* — Tinh Dang
(74) *Attorney, Agent, or Firm* — Burris Law, PLLC

(57) ABSTRACT

A vehicle driveline component having a housing, a shaft received in the housing, a lubricant pathway coupled to the shaft for rotation therewith, a sleeve disposed coaxially about the lubricant pathway, and a fluid feed conduit coupled to the component housing. The lubricant pathway is disposed helically about an exterior surface of the shaft. The sleeve has a feed port. The fluid feed conduit having an outlet that is in fluid communication with the feed port. Lubricant in the lubricant pathway that has been discharged from the outlet of the fluid feed conduit travels in a predetermined axial direction along the rotary axis of the shaft when the shaft rotates about the rotary axis in a predetermined rotational direction.

21 Claims, 6 Drawing Sheets

(56) References Cited

U.S. PATENT DOCUMENTS

| | | |
|---|---|---|
| 7,753,173 B2 | 7/2010 | Gratzer et al. |
| 7,841,449 B2 | 11/2010 | Nakamura et al. |
| 7,984,791 B2 | 7/2011 | Taguchi et al. |
| 8,316,738 B2 | 11/2012 | Hellinger et al. |
| 9,423,017 B1 | 8/2016 | Francis et al. |
| 9,506,504 B2 | 11/2016 | Francis et al. |
| 9,752,671 B2 | 9/2017 | Kampe et al. |
| 9,925,868 B2 | 3/2018 | Palazzolo et al. |
| 2004/0159520 A1 | 8/2004 | Anwar et al. |
| 2005/0034927 A1 | 2/2005 | Hong |
| 2005/0202920 A1 | 9/2005 | Kelley |
| 2006/0100053 A1 | 5/2006 | Asahi et al. |
| 2010/0065395 A1 | 3/2010 | Baer et al. |
| 2010/0122887 A1 | 5/2010 | Pritchard et al. |
| 2013/0193816 A1* | 8/2013 | Iwase .................. B60K 6/387 310/75 R |
| 2015/0275993 A1 | 10/2015 | Elsesser |

\* cited by examiner

US 10,816,082 B2

VEHICLE DRIVELINE COMPONENT HAVING ROTATABLE LUBRICANT PATHWAY FOR TRANSMITTING LUBRICATING FLUID TO DESIRED LOCATION

FIELD

The present disclosure relates to a vehicle driveline component having a rotatable lubricant pathway for transmitting lubricating fluid to a desired location.

BACKGROUND

Vehicle driveline components, including transfer cases and power take-off units, commonly include complex drive mechanisms, such as friction clutches, that require consistent lubrication at targeted areas during the operation of the vehicle driveline component to ensure desired longevity of the vehicle driveline component. It is relatively commonplace for such vehicle driveline components to make use of lubrication systems that employ a dedicated, electrically driven lubrication pump to provide pressurized lubrication to the vehicle driveline component. While such lubrication systems are well suited for their intended purpose, they are nevertheless relatively costly and add complexity not only to the vehicle driveline component, but also to the vehicle due to the need to provide electrical power to the electrically driven lubrication pump. Consequently, there remains a need in the art for a vehicle driveline component that provides consistent lubrication to targeted areas without the need for a dedicated, electrically driven lubrication pump.

SUMMARY

This section provides a general summary of the disclosure, and is not a comprehensive disclosure of its full scope or all of its features.

In one form, the present disclosure provides a vehicle driveline component that includes a component housing, a first shaft, a lubricant pathway, a fluid feed conduit and a sleeve. The component housing defines an interior chamber with a sump that is configured to hold a predetermined volume of a liquid lubricant therein. The first shaft is received in the interior chamber and is supported by the component housing for rotation about a first rotary axis. The lubricant pathway is coupled to the first shaft for rotation therewith. The lubricant pathway is disposed helically about an exterior surface of the first shaft. The fluid feed conduit is coupled to the component housing and has an outlet that is disposed proximate the lubricant pathway. The sleeve is disposed coaxially about the lubricant pathway and has a feed port that is in fluid communication with the outlet of the fluid feed conduit. Lubricant in the lubricant pathway that has been discharged from the outlet of the fluid feed conduit travels in a predetermined axial direction along the first rotary axis when the first shaft rotates about the first rotary axis in a predetermined rotational direction.

In another form, the present disclosure provides a vehicle driveline component that includes a component housing, first and second shafts, first and second sprockets, a chain, a clutch, a lubricant pathway, a lubricant housing a first feed conduit, a second feed conduit and a sleeve. The component housing defines an interior chamber with a sump that is configured to hold a predetermined volume of a liquid lubricant therein. The first shaft is received in the interior chamber and is supported by the component housing for rotation about a first rotary axis. The second shaft is received in the interior chamber and is supported by the component housing for rotation about a second rotary axis that is offset from the first rotary axis. The first sprocket is rotatably disposed about the first shaft while the second sprocket is coupled to the second shaft for common rotation. The chain disposed about and engages the first and second sprockets. The clutch has a clutch input, which is coupled to the first shaft for rotation therewith, and a clutch output that is rotatably coupled to the first sprocket. The clutch input defines a hub, which is mounted to the first shaft, and an annular lubrication chamber. The clutch is operable in first mode in which the clutch input is rotatable relative to the clutch output, and a second mode in which the clutch output is rotatably coupled to the clutch output. The lubricant pathway is coupled to the first shaft for rotation therewith. The lubricant pathway is disposed helically about an exterior surface of the first shaft and extends along the first rotary axis into the annular lubrication chamber. The lubrication housing is disposed about the lubrication pathway. The first fluid feed conduit is coupled to the lubrication housing and includes a first outlet. The second fluid feed conduit is coupled to the lubrication housing and includes a second outlet. The sleeve is disposed coaxially about the lubricant pathway and has a first feed port, which is in fluid communication with the first outlet of the first fluid feed conduit, and a second feed port that is in fluid communication with the second outlet of the second feed conduit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
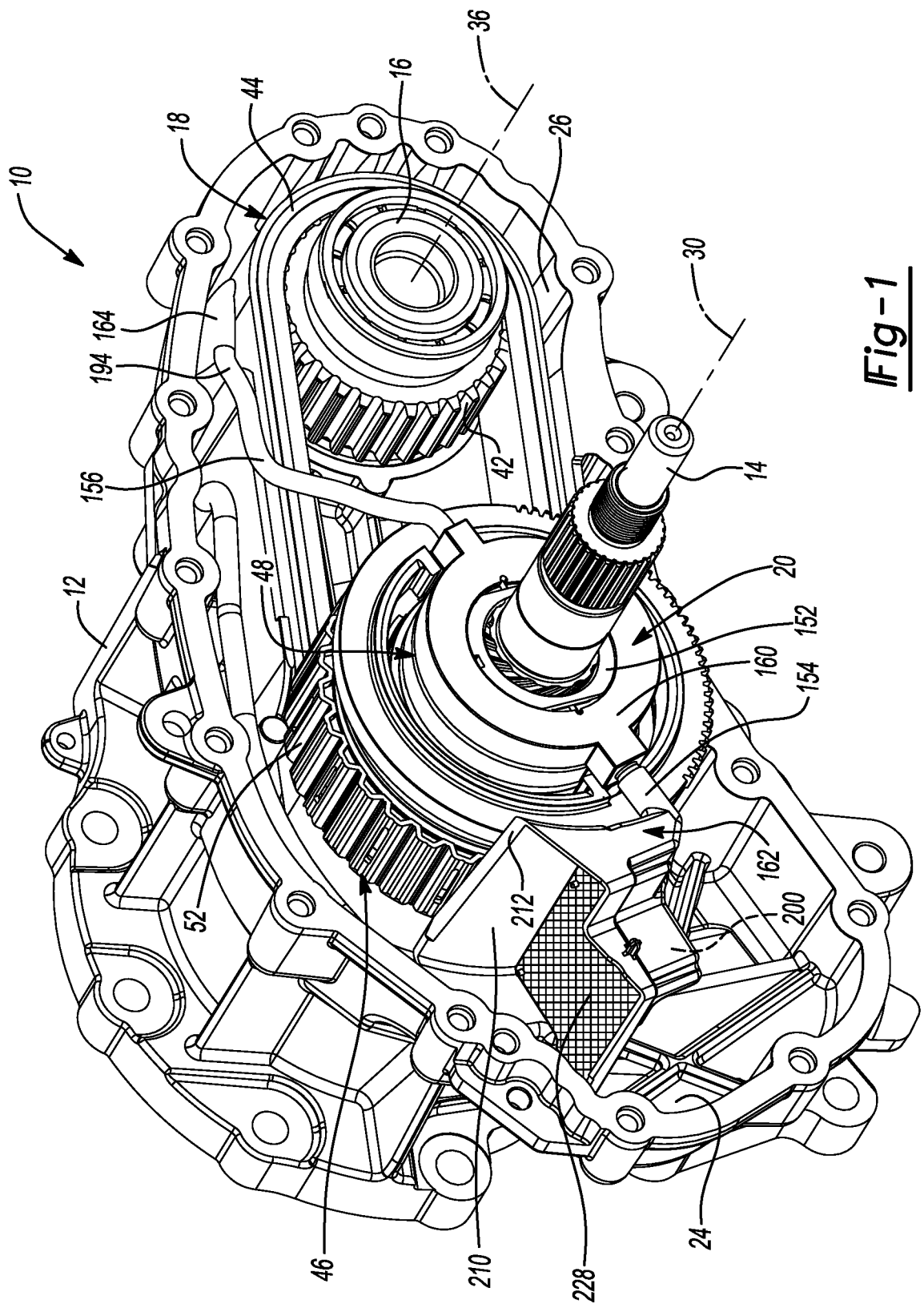
FIG. 1 is a perspective view of a portion of an exemplary vehicle driveline component, the vehicle driveline component being shown with a portion of a housing removed for clarity.
Figure 2:
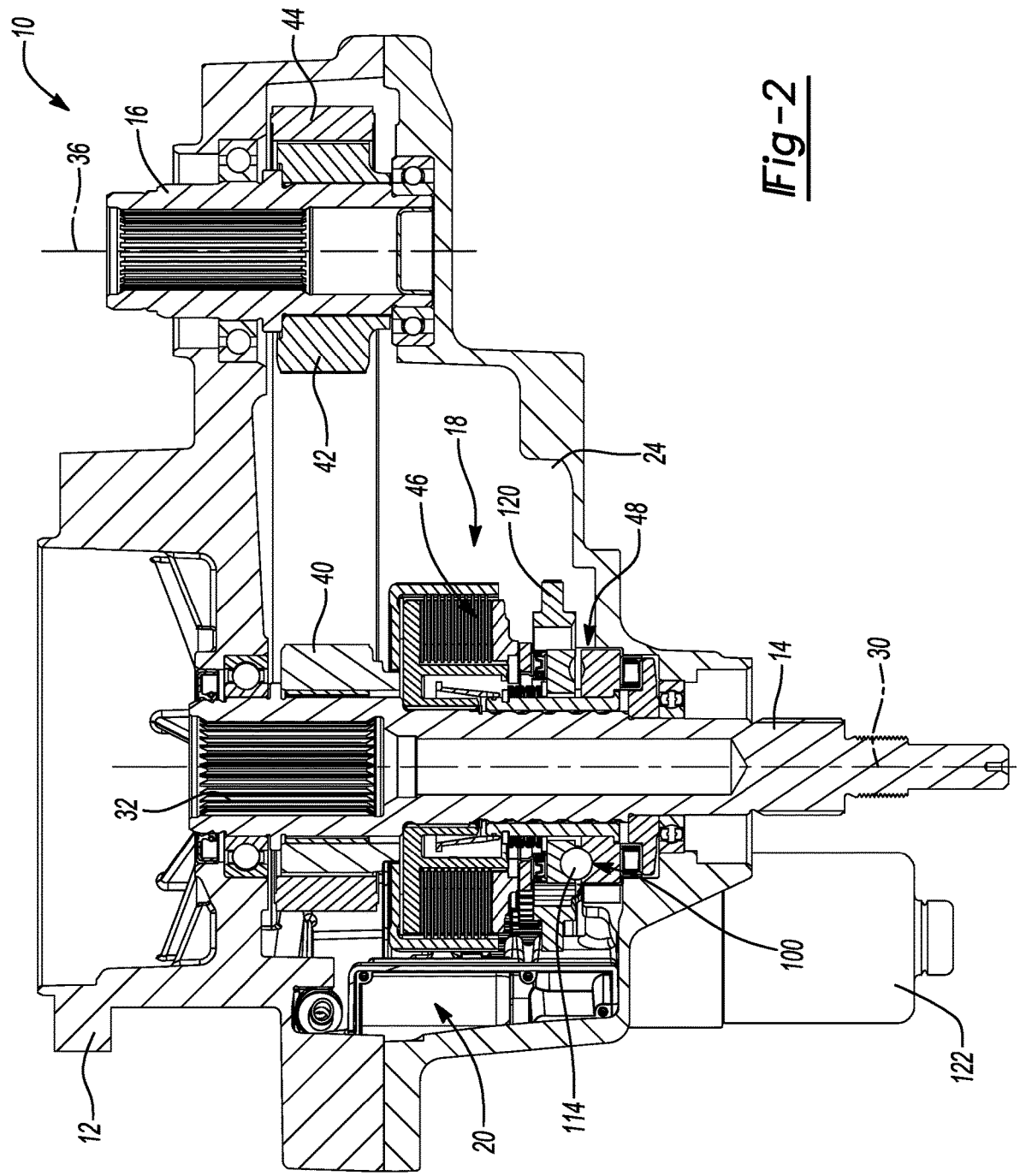
FIG. 2 is a section view taken along the line 2-2 of FIG. 1.

With reference to FIGS. 1 and 2 of the drawings, an exemplary vehicle driveline component constructed in accordance with the teachings of the present disclosure is generally indicated by reference numeral 10. In the particular example provided, the vehicle driveline component 10 is depicted as being a transfer case, but it will be appreciated that the teachings of the present disclosure have application to other vehicle driveline components, such as power take-off units. The vehicle driveline component 10 is configured to be operated in a range of operating positions in which the roll and pitch of the vehicle are varied within predefined limits. The range of operating positions includes a baseline operating position in which the vehicle is operated on flat level ground. The vehicle driveline component 10 can include a (component) housing 12, a first shaft 14, a second shaft 16, a drive mechanism 18 and a lubrication system 20.

The housing 12 can be formed in two or more pieces and can define an interior chamber 24. The interior chamber 24 can define a sump 26 that is configured to hold a predetermined volume of a liquid lubricant therein.

The first shaft 14 is received in the interior chamber 24 and is supported by the housing 12 for rotation about a first rotary axis 30. In the example provided, the first shaft 14 is a rear output shaft of the transfer case and includes a female splined bore 32 into which a male splined input shaft (not shown) can be received. The second shaft 16 is received in the interior chamber 24 and is supported by the housing for rotation about a second rotary axis 36 that is parallel to but offset from the first rotary axis 30.

The drive mechanism 18 can be configured to selectively transmit rotary power between the first and second shafts 14 and 16 can include a first sprocket 40, a second sprocket 42, a chain 44, a clutch 46 and a clutch actuator 48. The first sprocket 40 can be received coaxially about the first shaft 14 and can be rotatable relative to the first shaft 14. The second sprocket 42 can be coupled to the second shaft 16 for common rotation about the second rotary axis 36. The chain 44 can be disposed about and engages the first and second sprockets 40 and 42 to facilitate the transmission of rotary power between the first and second sprockets 40 and 42. The clutch 46 can be any type of clutch or coupling that can selectively couple the first sprocket 40 to the first shaft 14.

Figure 3:
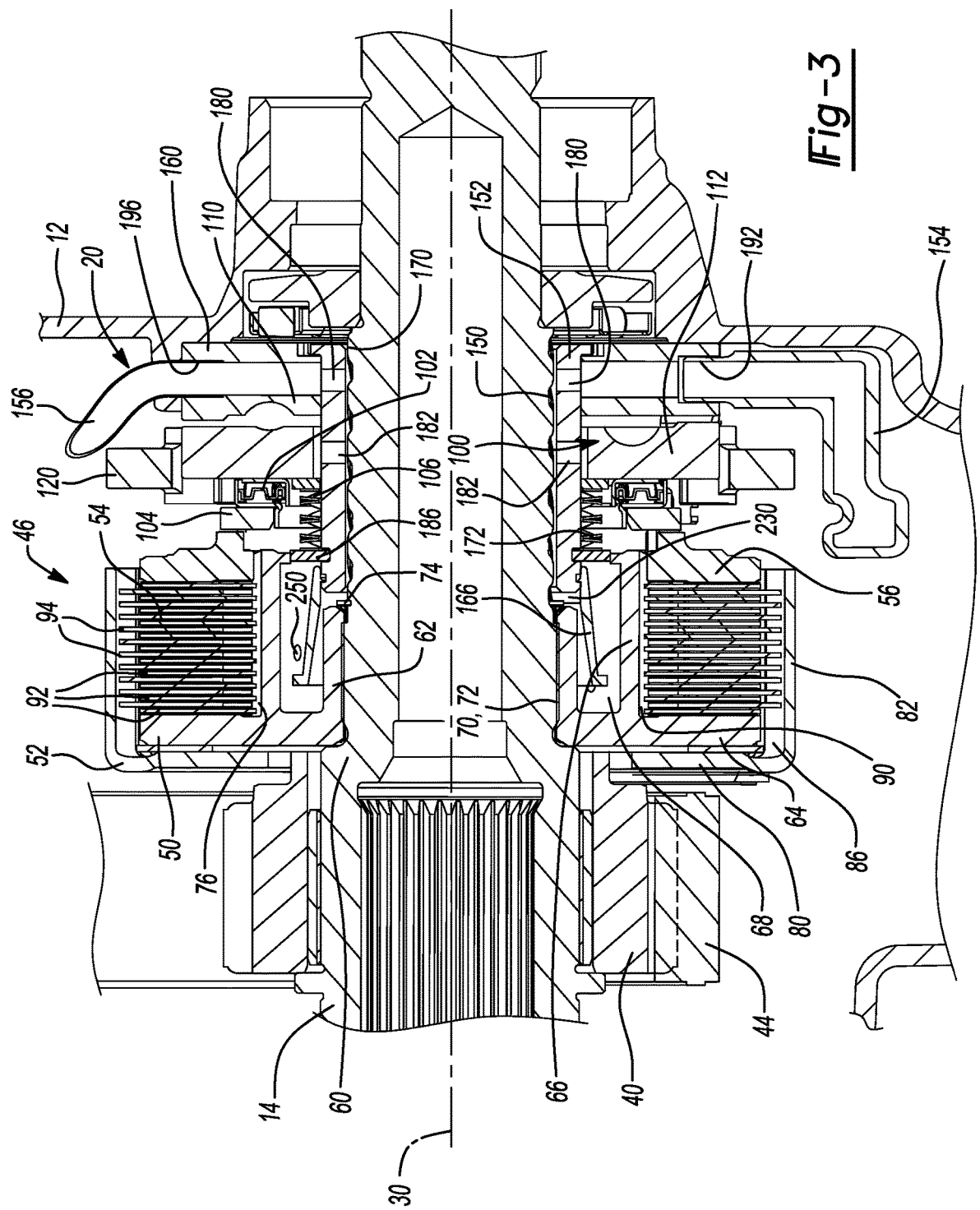
FIG. 3 is a section view taken along the line 3-3 of FIG. 1.

With reference to FIG. 3, the clutch 46 is a friction clutch in the particular example provided and has a first clutch member 50, a second clutch member 52, a clutch pack 54 and an apply plate 56. In the example provided, the first clutch member 50 is the input of the clutch 46 and is coupled to the first shaft 14 for common rotation, the second clutch member 52 is the output of the clutch 46 and is coupled to the first sprocket 40 for common rotation, and the clutch 46 is operable in a first mode, in which the first and second clutch members 50 and 52 are rotatable relative to one another, and a second clutch mode in which the second clutch member 52 is rotatably coupled to the first clutch member 50.

The first clutch member 50 can be abutted against a shoulder 60 formed on the first shaft 14 and can define a hub 62, a radial flange 64, a plate mount 66 and an annular lubrication chamber 68. The hub 62 can be a sleeve-like structure having a set of female spline teeth 70 that matingly engage male spline teeth 72 formed on the first shaft 14. An external snap ring 74 can be engaged to the first shaft 14 to limit or inhibit movement of the first clutch member 50 along the first rotary axis 30 in a direction away from the shoulder 60. The radial flange 64 can be an annular structure that can be fixedly coupled to an axial end of the hub 62 proximate the shoulder 60. The plate mount 66 can be an annular structure that can project from the radial flange 64 so as to extend coaxially with the hub 62. The plate mount 66 can define a set of male spline teeth 76 that are disposed about a radially outer surface of the plate mount 66. The annular lubrication chamber 68 can be disposed radially between the hub 62 and the plate mount 66.

The second clutch member 52 can include a radial wall member 80, which can be rotatably coupled to the first sprocket 40, and an annular wall member 82 that can extend from the radial wall member 80. The annular wall member 82 can define a set of female spline teeth 86 that are disposed about a radially inner surface of the annular wall member 82.

The clutch 46 defines a clutch pack cavity 90 in the annular space between the plate mount 66 and the annular wall member 82. The clutch pack 54 can be received into the clutch pack cavity 90. The clutch pack 54 can include a plurality of first clutch plates 92 and a plurality of second clutch plates 94 that are interleaved with the first clutch plates 92. The first clutch plates 92 can define a female splined aperture (not specifically shown) that can matingly engage the set of male spline teeth 76 on the plate mount 66 so that the first clutch plates 92 are non-rotatably but axially-slidably coupled to the plate mount 66. Similarly, the second clutch plates 94 have a male splined outer peripheral surface (not specifically shown) that can matingly engage the set of female spline teeth 86 on the annular wall member 82 so that the second clutch plates 94 are non-rotatably but axially-slidably coupled to the annular wall member 82. A first end of the clutch pack 54 can abut the radial flange 64 on the first clutch member 50. The apply plate 56 can be abut a second, opposite end of the clutch pack 54. The apply plate 56 can have a female splined aperture (not specifically shown) that can be matingly engaged to the set of male splined teeth 76 on the plate mount 66.

While the clutch 46 has been described herein as having a clutch input (i.e., first clutch member 50) that receives rotary power from the first shaft 14, it will be appreciated that the clutch 46 could be configured differently in another vehicle driveline component. For example, the clutch 46 could be configured so that the first clutch member 50 is the output of the clutch 46 (i.e., the second clutch member 52 is coupled to the first shaft 14 for common rotation and the first clutch member 50 is coupled to the first sprocket 40 for common rotation).

Figure 4:
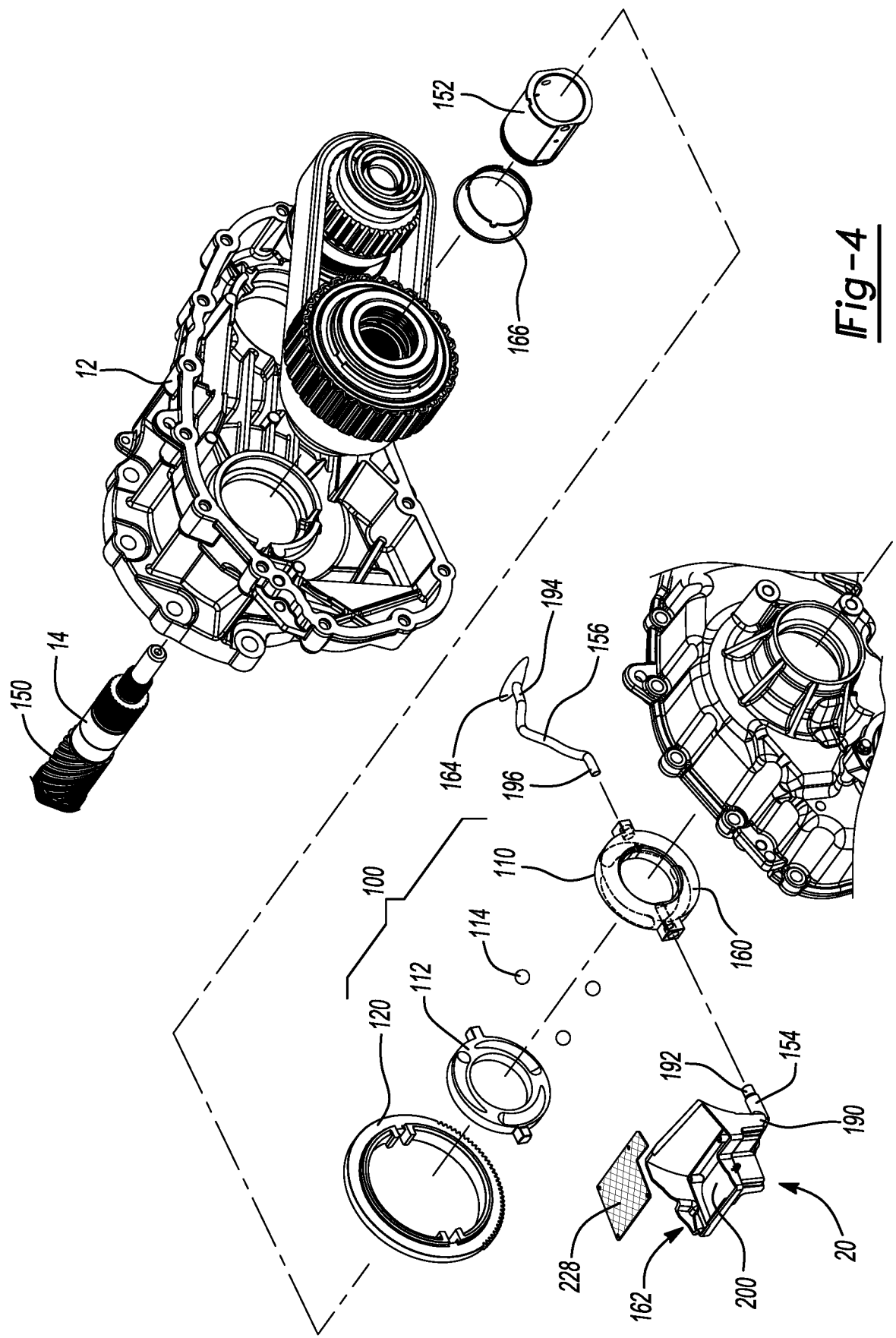
FIG. 4 is an exploded perspective view of the vehicle driveline component of FIG. 1.

With reference to FIGS. 3 and 4, the clutch actuator 48 can be any type of mechanism for selectively changing the mode in which the clutch 46 operates. In this regard, the clutch actuator 48 could comprise any type of linear motor. In the example provided, the clutch actuator 48 includes a ball-ramp mechanism 100, a thrust bearing 102, a pressure plate 104, and a return spring 106. The ball-ramp mechanism 100 includes a stationary ramp ring 110, a rotary ramp ring 112 and a plurality of balls 114 that are received in tapered ramp grooves formed in each of the stationary and rotary ramp rings 110 and 112. The stationary ramp ring 110 is disposed about the first shaft 14 and is fixedly coupled to the housing 12. The rotary ramp ring 112 is disposed about the first shaft 14 and is configured to rotate about the first rotary axis 30, as well as translate along the first rotary axis 30 as a function of the rotational position of the rotary ramp ring 112 relative to the stationary ramp ring 110. The rotary ramp ring 112 can be non-rotatably but axially slidably coupled to a sector ring 120 that can be driven by an electric motor 122 (FIG. 1) through a transmission (not specifically shown). The sector ring 120, transmission and electric motor 122 (FIG. 1) can be configured in a conventional manner that is well known in the art. The pressure plate 104 is an annular structure that is received about the first shaft and abutted against the pressure plate 104. The thrust bearing 102 is disposed between the rotary ramp ring 112 and the pressure plate 104. The return spring 106 is disposed about the first shaft 14 and is configured to bias the thrust bearing 102 and the rotary ramp ring 112 along the first rotary axis 30 toward the stationary ramp ring 110. The return spring 106 can be any type of spring, but in the example provided, the return spring 106 is a wave spring.

The lubrication system 20 includes a lubricant pathway 150, a sleeve 152 and at least one fluid feed conduit, such as a first fluid feed conduit 154 and a second fluid feed conduit 156. The lubrication system 20 can further include one or more of a lubricant housing 160, a reservoir 162, a funnel 164 and a lubricant guide 166.

The lubricant pathway 150 is coupled to the first shaft 14 for rotation therewith and is disposed helically about an exterior surface 170 of the first shaft 14. The lubricant pathway 150 can be unitarily and integrally formed with the first shaft 14, or could be a discrete structure, such as a helical spring (not shown), that is assembled to the first shaft 14. In the example provided, the lubricant pathway 150 is a groove 172 that is formed into the exterior surface 170 of the first shaft 14 and extends along the first rotary axis 30 into the annular lubrication chamber 68.

The sleeve 152 can be received co-axially about the lubricant pathway 150 radially between the first shaft 14 and the stationary and rotary ramp rings 110 and 112 and the return spring 106. The sleeve 152 can be non-rotatably coupled (e.g., press-fit) to the stationary ramp ring 110 and can define a pair of inlet ports 180 and optionally one or more feed ports 182. An external snap ring 186 can be received in an annular groove disposed about the circumference of the sleeve 152 and can abut the return spring 106 on a side opposite the thrust washer 102. The feed port(s) 182, if included, can be disposed along a length of the sleeve 152 at locations where oil can exit the space between the lubricant pathway 150 and the sleeve 152 and can lubricate desired components of the vehicle driveline component 10, such as the thrust bearing 102.

The first fluid feed conduit 154 is a discrete component that is coupled to the housing 12 and has a first inlet 190 and a first outlet 192. Similarly, the second fluid feed conduit 156 is a discrete component that is coupled to the housing 12 and has a second inlet 194 and a second outlet 196. The first and second inlets 190 and 194 are each configured to receive lubrication that has been slung from a moving component of the vehicle driveline component 10 or that has been skimmed from lubricant that clings to a moving component of the vehicle driveline component 10. The first and second outlets 192 and 196 are each disposed proximate the lubricant pathway 150 and discharge lubricant therefrom into a respective one of the inlet ports 180 in the sleeve 152. Lubricant in the lubricant pathway 150 that has been discharged through the inlet ports 180 from the first and second outlets 192 and 196 travels in a predetermined axial direction along the first rotary axis 30 (i.e., toward the hub 62 of the first clutch member 50 in the example provided) when the first shaft 14 rotates about the first rotary axis 30 in a predetermined rotational direction.

The lubricant housing 160 can be fixedly coupled to the housing 12 and each of the first and second fluid feed conduits 154 and 156 and can fluidly couple the first and second outlets 192 and 196 with the inlet ports 180 of the sleeve 152. The lubricant housing 160 can be fixedly coupled to the stationary ramp ring 110, and in the example provided, the lubricant housing 160 is unitarily and integrally formed with the stationary ramp ring 110.

Figure 5:
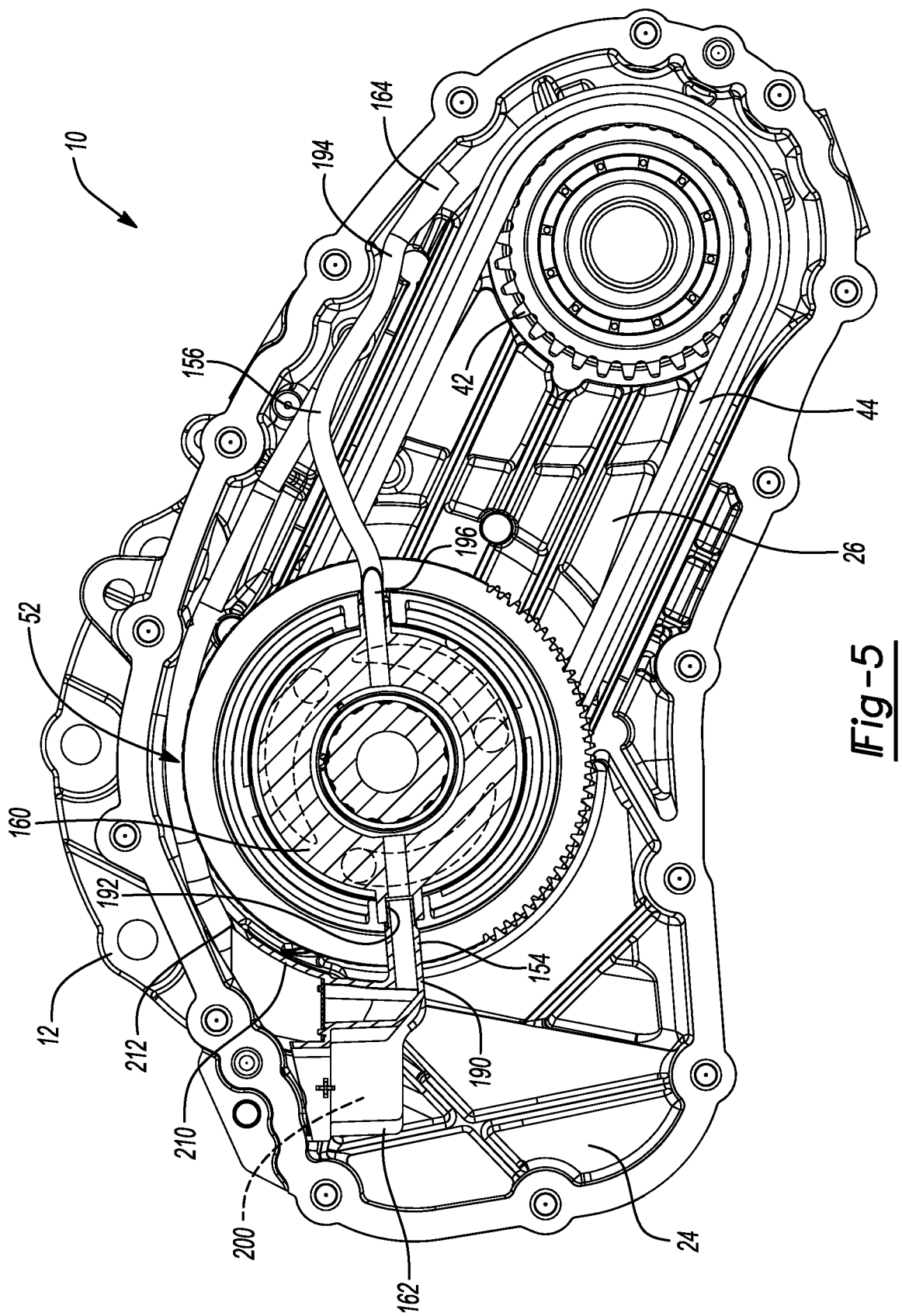
FIG. 5 is a section view of the vehicle driveline component of FIG. 1 depicting a lubrication system in greater detail.
Figure 6:
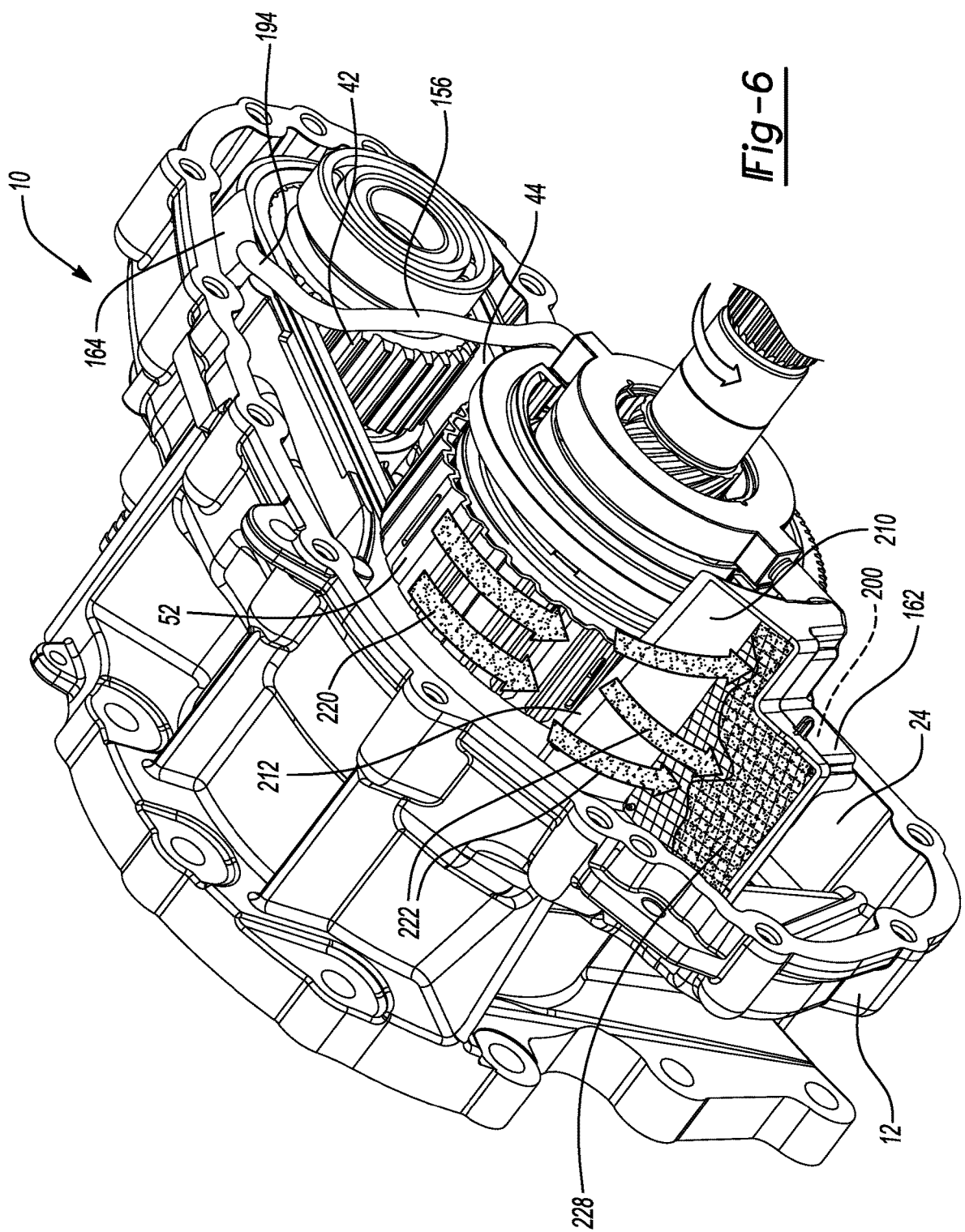
FIG. 6 is a perspective view of a portion of the vehicle driveline component of FIG. 1 depicting lubricant collection during operation of the vehicle driveline component.

With reference to FIGS. 1, 5 and 6, the reservoir 162 can be received in the interior chamber 24 and coupled to the housing 12. The first inlet 190 of the first fluid feed conduit 154 can be coupled in fluid communication to the reservoir 162. The reservoir 162 can have a reservoir chamber 200 that is configured to receive lubrication that has been slung from a moving component of the vehicle driveline component 10. Additionally or alternatively, the reservoir 162 can be configured to skim lubricant from a moving component of the vehicle driveline component 10. In the example provided, the reservoir 162 further includes a lubricant skimmer 210 having a skimmer edge 212 that is disposed proximate the second clutch member 52. The second clutch member 52 is rotatable through the sump 26 such that a portion of the lubricant in the sump clings to the second clutch member 52 (the clinging lubrication is represented by arrows 220 in FIG. 6) as the second clutch member 52 rotates through the sump 26. The skimmer edge 212 is positioned and configured to skim a portion of the lubricant that clings to the second clutch member 52 as the second clutch member rotates (the lubrication skimmed from the second clutch member 52 is represented by arrows 222 in FIG. 6). The lubricant that is skimmed from the second clutch member 52 is received into the reservoir chamber 200. If desired, the reservoir 162 can include filtering element 228, such as a screen, that can be interposed between the lubricant skimmer 210 and the reservoir chamber 200. In the particular example provided, the first outlet 192 of the first fluid feed conduit 154 is disposed vertically above the first inlet 190 of the first fluid feed conduit 154 when the vehicle driveline component 10 is disposed in the baseline operating position. Configuration in this manner ensures that lubricant will drain from the reservoir chamber 200 into the first fluid feed conduit 154 when the reservoir chamber 200 is filled to predetermined minimum volume. While the movable component has been described as being the second clutch member 52 in the example provided, it will be appreciated that the lubricant skimmer 210 could be configured to skim lubricant from another component of the vehicle driveline component 10, such as the chain 44.

The funnel 164 can be coupled to the second inlet 194 of the second fluid feed conduit 156. The funnel 164 can flare outwardly from the second inlet 194 and can be positioned proximate a movable component of the vehicle driveline component 10. For example, the funnel 164 can be disposed proximate the chain 44 near the second sprocket 42. In this example, the chain 44 passes through the lubricant in the sump 26 as it contacts and rotates about the second sprocket 42. When rotary power is input to the vehicle driveline component 10 in a predetermined rotational direction, lubricant that clings to the chain 44 as links of the chain 44 exit the sump 26 can be slung into the funnel 164 and can drain through the second inlet 194 into the second fluid feed conduit 156.

Returning to FIG. 3, the annular lubrication chamber 68 extends in the predetermined axial direction along the first rotary axis 30 past a location where the lubricant pathway 150 discharges lubrication into the annular lubrication chamber 68 (i.e., an axial gap 230 that is disposed between the hub 62 and the sleeve 152). The lubricant guide 166 can be received in the annular lubrication chamber 68 and can be configured to urge lubricant that has been discharged from the lubricant pathway 150 into the annular lubrication chamber 68 toward a distal axial end of the annular lubrication chamber 68 that is spaced in the predetermined axial direction along the first rotary axis 30 from the location where lubricant is discharged from the lubricant pathway 150 into the annular lubrication chamber 68. In the example provided, the lubricant guide 166 is coupled to the first shaft 14 for rotation therewith and has a frusto-conical shape that diverges outwardly from the first shaft 14 with decreasing distance toward the radial flange 64 of the first clutch member 50. Accordingly, lubricant that is discharged from the lubricant pathway 150 into the annular lubrication chamber 68 can be slung against the interior conical surface of the lubricant guide 166 and can drain out of the lubricant guide 166 toward the distal axial end of the annular lubrication chamber 68. Lubrication apertures 250 can be disposed through the plate mount 66 and can fluidly couple the annular lubrication chamber 68 to the clutch pack cavity 90 in the clutch 46 where the first and second clutch plates 92 and 94 are disposed.

With reference to FIGS. 1 and 3, during operation of the vehicle driveline component 10, lubricant received into the reservoir 162 and the funnel 164 can be directed through the first and second fluid feed conduits 154 and 156, respectively, through the inlet ports 180 in the sleeve 152 to a radial space between the sleeve 152 and the first shaft 14. Lubricant is received in the lubricant pathway 150 and during rotation of the first shaft 14 in the predetermined rotational direction, lubrication between the lubricant pathway 150 and the sleeve 152 is urged in the predetermined axial direction along the first rotary axis 30 and is discharged through the axial gap 230 that is disposed between the hub 62 and the sleeve 152. Thereafter, centrifugal forces acting on the lubricant that exits through the gap 230 is slung against the interior surface of the lubricant guide 166 and directed axially toward the distal end of the annular lubrication chamber 68. Fluid in the distal end of the annular lubrication chamber 68 passes through the lubrication apertures 250 in the plate mount 66 into the clutch pack cavity 90 to lubricate the first and second clutch plates 92 and 94. Accordingly, the ball-ramp mechanism 100, the thrust bearing 102 and the clutch pack 54 can be reliably and consistently lubricated without the need for an electrically driven pump.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
   a component housing defining an interior chamber, the interior chamber defining a sump that is adapted to hold a predetermined volume of a liquid lubricant therein;
   a first shaft received in the interior chamber, the first shaft being supported by the component housing for rotation about a first rotary axis;
   a lubricant pathway coupled to the first shaft for rotation therewith, the lubricant pathway being disposed helically about an exterior surface of the first shaft;
   a fluid feed conduit coupled to the component housing, the fluid feed conduit having an outlet; and
   a sleeve disposed coaxially about the lubricant pathway, the sleeve having a feed port that is in fluid communication with the outlet of the fluid feed conduit;
   wherein lubricant in the lubricant pathway that has been discharged from the outlet of the fluid feed conduit travels in a predetermined axial direction along the first rotary axis when the first shaft rotates about the first rotary axis in a predetermined rotational direction.

2. The vehicle driveline component of claim 1, further comprising a lubricant housing that is fixedly coupled to the fluid feed conduit, the lubricant housing coupling the feed port to the outlet of the fluid feed conduit.

3. The vehicle driveline component of claim 2, further comprising a ball-ramp actuator having a pair of ball-ramp rings, wherein one of the ball-ramp rings is fixedly coupled to the lubricant housing.

4. The vehicle driveline component of claim 3, wherein the one of the ball-ramp rings is unitarily and integrally formed with the lubricant housing.

5. The vehicle driveline component of claim 3, further comprising a friction clutch having a clutch input and a clutch output, wherein one of the clutch input and the clutch output is coupled to the first shaft for rotation therewith, and wherein the one of the clutch input and the clutch output defines an annular lubrication chamber into which the lubricant pathway extends.

6. The vehicle driveline component of claim 5, wherein the one of the clutch input and the clutch output defines a hub, which is mounted to the first shaft, and a plate mount to which a plurality of clutch plates are non-rotatably but axially slidably coupled, the plate mount being spaced radially outwardly from the hub by the annular lubrication chamber, wherein lubrication apertures are disposed through the plate mount and fluidly couple the annular lubrication chamber to a clutch pack cavity in the friction clutch where the clutch plates are disposed.

7. The vehicle driveline component of claim 6, wherein the annular lubrication chamber extends in the predetermined axial direction along the first rotary axis past a location where the lubricant pathway discharges lubrication into the annular lubrication chamber, and wherein a lubricant guide is disposed in the annular lubrication chamber, the lubrication guide being configured to urge lubricant that has been discharged from the lubricant pathway into the annular lubrication chamber toward an axial end of the annular lubrication chamber that is spaced apart from the location in the predetermined axial direction along the first rotary axis.

8. The vehicle driveline component of claim 7, wherein the lubricant guide is coupled to the first shaft for rotation therewith.

9. The vehicle driveline component of claim 1, further comprising a reservoir coupled to the component housing, wherein the fluid feed conduit comprises an inlet that is coupled in fluid communication to the reservoir.

10. The vehicle driveline component of claim 9, wherein when the vehicle driveline component is disposed in a baseline operating position, the outlet of the fluid feed conduit is disposed vertically above the inlet of the fluid feed conduit.

11. The vehicle driveline component of claim 9, wherein the reservoir includes a lubricant skimmer having a skimmer edge that is disposed proximate a rotatable component, the rotatable component being rotatable through the sump such that a portion of the lubricant in the sump clings to the rotatable component as the rotatable component rotates through the sump, and wherein the skimmer edge is configured to skim a portion of the lubricant that clings to the rotatable component as the rotatable component rotates.

12. The vehicle driveline component of claim 11, further comprising a clutch having first and second clutch members, one of the first and second clutch members being coupled to the first shaft for common rotation, the clutch being operable in a first clutch mode in which the first and second clutch members are rotatable relative to one another, and a second clutch mode in which the first and second clutch members are rotationally coupled to one another, and wherein the rotatable component is one of the first and second clutch members.

13. The vehicle driveline component of claim 1, further comprising a funnel coupled to the fluid feed conduit on an end of the fluid feed conduit that is opposite the outlet.

14. The vehicle driveline component of claim 13, further comprising a second shaft, a first sprocket, a second sprocket and a chain, the second shaft being supported by the component housing for rotation about a second rotary axis that is parallel to and offset from the first rotary axis, the first sprocket being driven by one of the first and second shafts, the second sprocket being rotationally coupled to the other one of the first and second shafts, the chain engaging the first and second sprockets and transmitting rotary power therebetween, the funnel being positioned proximate the chain to receive lubricant that is slung from the chain during operation of the vehicle driveline component.

15. The vehicle driveline component of claim 1, wherein the lubricant pathway is a groove that is formed into the first shaft.

16. A vehicle driveline component comprising:
a component housing defining an interior chamber, the interior chamber defining a sump that is adapted to hold a predetermined volume of a liquid lubricant therein;
a first shaft received in the interior chamber and supported by the component housing for rotation about a first rotary axis;
a second shaft received in the interior chamber and supported by the component housing for rotation about a second rotary axis that is offset from the first rotary axis;
a first sprocket rotatably disposed about the first shaft;
a second sprocket coupled to the second shaft for common rotation;
a chain disposed about and engaging the first and second sprockets;
a clutch having a clutch input, which is coupled to the first shaft for rotation therewith, and a clutch output that is rotatably coupled to the first sprocket, the clutch input defining a hub, which is mounted to the first shaft, and an annular lubrication chamber, the clutch being operable in first mode in which the clutch input is rotatable relative to the clutch output, and a second mode in which the clutch output is rotatably coupled to the clutch output;
a lubricant pathway coupled to the first shaft for rotation therewith, the lubricant pathway being disposed helically about an exterior surface of the first shaft and extending along the first rotary axis into the annular lubrication chamber;
a lubricant housing that is disposed about the lubrication pathway;
a first fluid feed conduit coupled to the lubricant housing, the first fluid feed conduit having a first outlet;
a second fluid feed conduit coupled to the lubricant housing, the second fluid feed conduit having a second outlet; and
a sleeve disposed coaxially about the lubricant pathway, the sleeve having a first feed port that is in fluid communication with the first outlet of the first fluid feed conduit and a second feed port that is in fluid communication with the second outlet of the second fluid feed conduit.

17. The vehicle driveline component of claim 16, wherein the clutch is a friction clutch, wherein the clutch input further has a plate mount to which a plurality of clutch plates are non-rotatably but axially slidably coupled, the plate mount being spaced radially outwardly from the hub by the annular lubrication chamber, wherein lubrication apertures are disposed through the plate mount and fluidly couple the annular lubrication chamber to a clutch pack cavity in the friction clutch where the clutch plates are disposed.

18. The vehicle driveline component of claim 17, further comprising a reservoir coupled to the component housing, wherein the first fluid feed conduit comprises a first inlet that is coupled in fluid communication to the reservoir.

19. The vehicle driveline component of claim 18, wherein the reservoir includes a lubricant skimmer having a skimmer edge that is disposed proximate the clutch output, the clutch output being rotatable through the sump, and wherein the skimmer edge is disposed proximate the clutch output so as to be capable of skimming lubricant from the clutch output that clings to a circumferential surface of the clutch output.

20. The vehicle driveline component of claim 19, further comprising a funnel, the second fluid feed conduit having a second inlet, the funnel being coupled in fluid communication with the second inlet.

21. The vehicle driveline component of claim 17, further comprising a funnel that is coupled in fluid communication with an inlet of the second fluid feed conduit, the funnel flaring outwardly from the inlet of the second fluid feed conduit.

* * * * *